(12) United States Patent
Fushimi

(10) Patent No.: US 10,202,216 B2
(45) Date of Patent: Feb. 12, 2019

(54) DECORATIVE GLASS CONTAINER AND METHOD FOR MANUFACTURING DECORATIVE GLASS CONTAINER

(71) Applicant: KOA GLASS CO., LTD, Tokyo (JP)

(72) Inventor: Kunihiro Fushimi, Chiba (JP)

(73) Assignee: KOA GLASS CO., LTD., Tokyo (JP)

( * ) Notice: Subject to any disclaimer, the term of this patent is extended or adjusted under 35 U.S.C. 154(b) by 372 days.

(21) Appl. No.: 14/962,213

(22) Filed: Dec. 8, 2015

(65) Prior Publication Data
US 2016/0083135 A1 Mar. 24, 2016

Related U.S. Application Data

(62) Division of application No. 13/991,668, filed as application No. PCT/JP2011/075907 on Nov. 10, 2011, now abandoned.

(30) Foreign Application Priority Data

Dec. 6, 2010 (JP) ................................. 2010-271030

(51) Int. Cl.
*B65D 1/02* (2006.01)
*C03C 17/00* (2006.01)
(Continued)

(52) U.S. Cl.
CPC ............ *B65D 1/0215* (2013.01); *B23K 26/40* (2013.01); *B65D 23/08* (2013.01); *C03C 17/003* (2013.01);
(Continued)

(58) Field of Classification Search
CPC ...... B65D 1/0215; B65D 23/08; B23K 26/40; B23K 2201/35; B23K 2101/35;
(Continued)

(56) References Cited

U.S. PATENT DOCUMENTS 8,202,592 B2    6/2012   Hsu et al.

FOREIGN PATENT DOCUMENTS

GB          2131324      6/1984
JP          55-23222     6/1980
(Continued)

OTHER PUBLICATIONS

European Search Report dated May 6, 2015, for European Application No. 11846109.4, 6 pages.

*Primary Examiner* — Robert S Walters, Jr.
(74) *Attorney, Agent, or Firm* — Fitch, Even, Tabin & Flannery, L.L.P.

(57) ABSTRACT

A decorative glass container has clear boundary lines and good adhesion properties, and has a lower layer including a thick wall portion and a thin wall portion, a vapor-deposition layer patterned by a forming region and a non-forming region, and an overcoat layer made of a UV curable resin, on the upper part of the glass container in order. A method for manufacturing the decorative glass container, in which the forming region of the vapor-deposition layer is disposed on the upper part of the thick wall portion of the lower layer, the non-forming region of the vapor-deposition layer is disposed on the upper part of the thin wall portion of the lower layer, and a contact region is provided in which the lower layer and the overcoat layer are in direct contact with each other by way of the non-forming region of the vapor-deposition layer.

6 Claims, 8 Drawing Sheets

(51) Int. Cl.
  *B65D 23/08* (2006.01)
  *C03C 17/38* (2006.01)
  *B23K 26/40* (2014.01)
  *B23K 101/34* (2006.01)
(52) U.S. Cl.
  CPC ............ *C03C 17/005* (2013.01); *C03C 17/38* (2013.01); *B23K 2101/35* (2018.08); *C03C 2217/72* (2013.01); *C03C 2218/328* (2013.01)
(58) Field of Classification Search
  CPC ..... C03C 17/003; C03C 17/005; C03C 17/38; C03C 2217/72; C03C 2218/328
  See application file for complete search history.

(56) References Cited

FOREIGN PATENT DOCUMENTS

| | | |
|---|---|---|
| JP | 56-140042 | 11/1981 |
| JP | 57-105386 | 6/1982 |
| JP | 60-248353 | 12/1985 |
| JP | 2-258090 | 10/1990 |
| JP | 2000-282221 | 10/2000 |
| JP | 2009-6673 | 1/2009 |

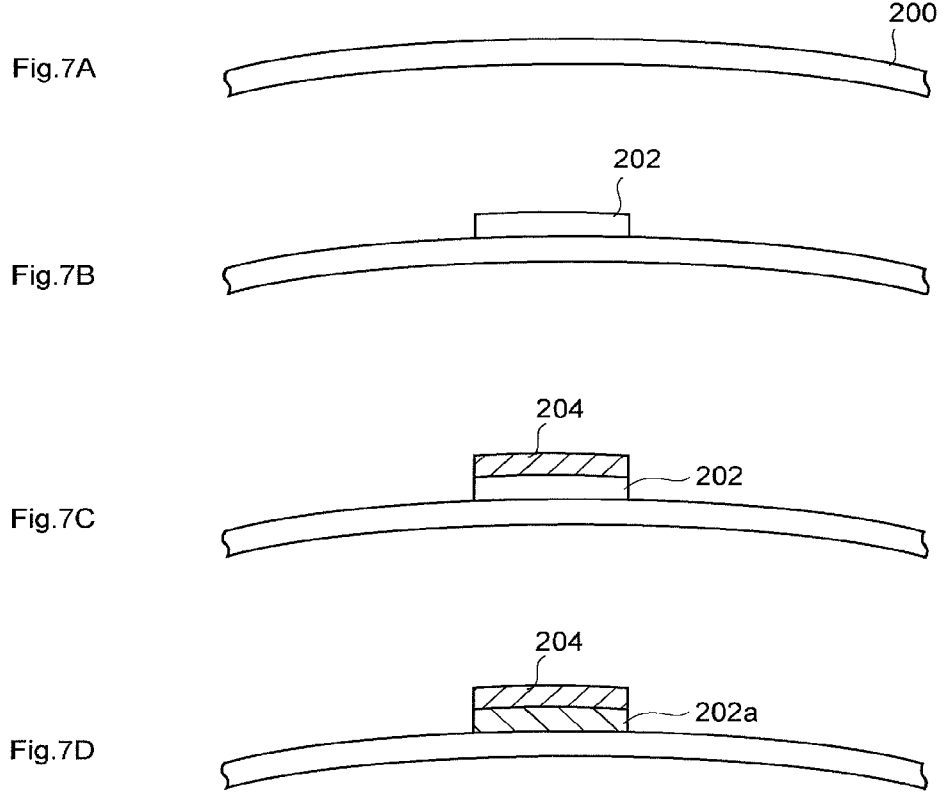

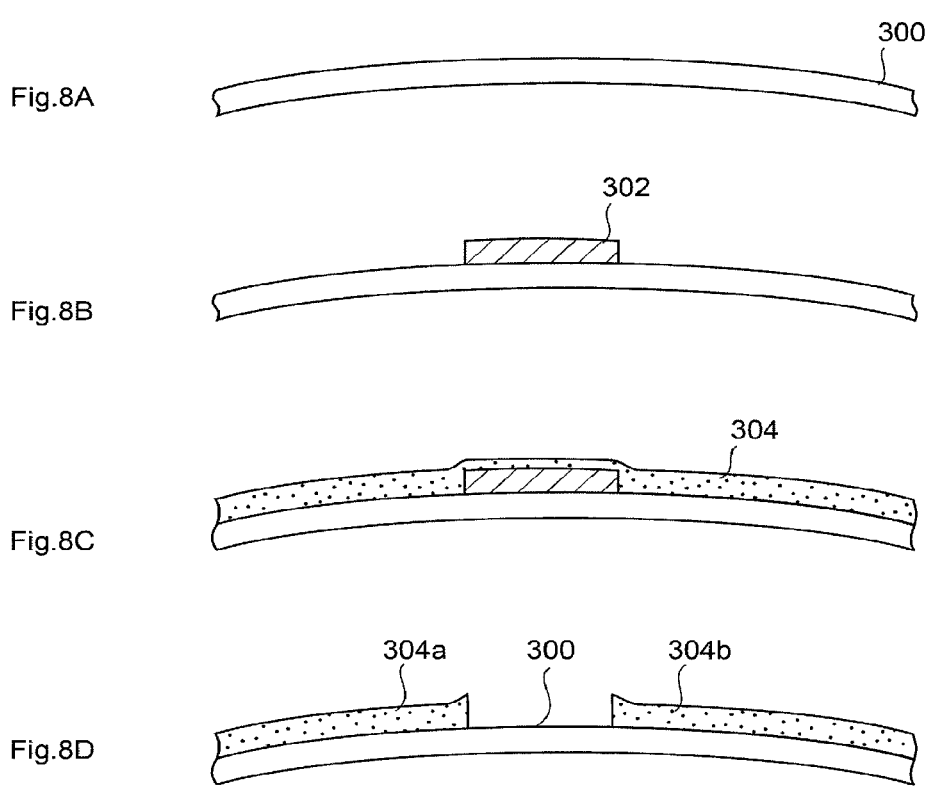

DECORATIVE GLASS CONTAINER AND METHOD FOR MANUFACTURING DECORATIVE GLASS CONTAINER

CROSS-REFERENCE TO RELATED APPLICATIONS

This application is a divisional application of U.S. application Ser. No. 13/991,668 filed Jun. 5, 2013, which is a U.S. national phase application filed under 35 U.S.C. § 371 of International Application PCT/JP2011/075907, filed on Nov. 10, 2011, designating the United States, which claims priority from Japanese Application No. 2010-271030 filed Dec. 6, 2010, the contents of each of which are incorporated herein by reference in their entirety.

BACKGROUND

Technical Field

The present invention relates to a decorative glass container and a method for manufacturing the decorative glass container. In particular, it relates to a decorative glass container having a vapor-deposition layer with a predetermined pattern, and a method for manufacturing the decorative glass container having a vapor-deposition layer.

Related Art

Various methods have been conventionally suggested for manufacturing a decorative glass container having a vapor-deposition layer with a predetermined pattern.

For example, a method of forming a patterned vapor-deposition layer on a glass container by a hot stamping method using a thermosetting resin or the like has been suggested.

More specifically, as illustrated in FIG. 7, a thermosetting resin is pattern-printed on a glass container 200 by screen printing, and under predetermined conditions, a heating treatment is performed to give a semi-cured thermosetting resin 202. Subsequently, a transfer material for hot stamping including a vapor-deposition layer 204 (not illustrated) is laminated and the semi-cured thermosetting resin 202 is evenly compressed by using a heating elastomer or the like. While being peeled from the transfer material for hot stamping, the vapor-deposition layer 204 is transferred.

After that, as a final step, a completely cured thermosetting resin 202a is prepared by additional heating treatment to give a glass container having the vapor-deposition layer 204 with predetermined adhesion properties.

A method of forming a patterned vapor-deposition layer on a vapor-deposition base such as a glass sheet using a predetermined masking tape is also suggested.

More specifically, as illustrated in FIG. 8, to a predetermined spot on a glass container 300 as a vapor-deposition base, an oil-coated masking tape 302 is attached, and after performing a vapor-deposition treatment on the entire surface, a predetermined vapor-deposition layer 304 is formed.

Subsequently, the oil-coated masking tape 302 is removed to expose a part of the glass container 300, and a glass container having patterned vapor-deposition layer 304a and 304b is prepared.

CITATION LIST

Patent Documents

[Patent Document 1] JP5523222B (Claims and the like)
[Patent Document 2] JP2000282221A (Claims)

SUMMARY

However, the method for manufacturing a decorative glass container disclosed in Patent Document 1 is problematic in that, depending on pattern coating accuracy or curing level of the thermosetting resin, vapor-deposition pattern accuracy becomes irregular and, for a patterned vapor-deposition layer with large area, in particular, unclear boundary lines are easily yielded.

In addition, since an overcoat layer and a glass surface exposed to a non-forming region of the vapor-deposition layer are in direct contact with each other, there are problems in that the overcoat layer is easily peeled from the contact region and further, the patterned vapor-deposition layer is also easily peeled.

There are also problems in that each of a screen printing of a thermosetting resin on a glass container and an even heating and the like using an heating elastomer is essential, and thus it is difficult to apply on a three-dimensional surface with a step difference or, when two or more types of vapor-deposition layers are formed, the entire processes are complicated and excessively long production time is required.

Further, according to the method for manufacturing a glass container described in Patent Document 2, as a patterned vapor-deposition layer is formed by using a predetermined masking tape, the edge part of the vapor-deposition layer is folded or pattern accuracy of the vapor-deposition layer is poor, and as a result, there is a problem in that boundary lines of the patterned vapor-deposition layer are not clear.

In particular, when a vapor-deposition layer is formed in vacuum state using a masking tape, due to the thickness of the masking tape, a step difference is generated at the end part of the vapor-deposition layer, thus the end part swells, or air or low molecular weight components included in adhesives of the masking tape are scattered to cause uneven blackening of the vapor-deposition layer to be formed.

In addition, as a glass surface is exposed to a non-forming region of the vapor-deposition layer, it becomes in direct contact with an overcoat layer consisting of a thermosetting resin or a UV curable resin, and thus there are problems in that the overcoat layer is easily peeled from the contact region and also the patterned vapor-deposition layer is easily peeled.

Under the circumstances, inventors of the invention conducted intensive studies, and as a result found that, by forming film thickness difference in a lower layer of a decorative glass container, a contact region in which the lower layer and the overcoat layer are in direct contact with each other by way of a non-forming region of the vapor-deposition layer can be formed, and according to a predetermined method or the like, a patterned vapor-deposition layer can be formed in accordance with a step difference caused by the film thickness difference of the lower layer, and therefore the invention is completed accordingly.

Specifically, an object of the invention is to provide a decorative glass container having a patterned vapor-deposition layer at a predetermined spot by a predetermined method or the like, in which adhesion properties of the patterned vapor-deposition layer are improved, and also a method for manufacturing efficiently the decorative glass container.

According to the invention, the problems described above can be solved by providing a decorative glass container having, a lower layer including a thick wall portion and a thin wall portion, a vapor-deposition layer patterned by a forming region and a non-forming region, and an overcoat layer, on the upper part of the glass container in order, in which the forming region of the vapor-deposition layer is formed on the upper part of the thick wall portion of the lower layer and the non-forming region of the vapor-deposition layer is formed on the upper part of the thin wall portion of the lower layer, and also a contact region is formed in which the lower layer and the overcoat layer are in direct contact with each other by way of the non-forming region of the vapor-deposition layer.

According to the constitution above, the adhesion properties between a glass surface and a patterned vapor-deposition layer or the like are improved, and since the patterned vapor-deposition layer is formed in accordance with a step difference caused by the film thickness difference of the lower layer, the pattern accuracy of the vapor-deposition layer can be improved.

Further, the contact region between the lower layer and the overcoat layer preferably has a predetermined area. However, it may be also a group of dot-shape or line-shape contact region.

Further, for constituting the decorative glass container of the invention, it is preferable that a patterned decorative layer be additionally formed between the patterned vapor-deposition layer and the overcoat layer and be overlapped with the patterned vapor-deposition layer.

According to this constitution, a laminated spot between the patterned vapor-deposition layer and the decorative layer is generated so that decorative properties of the decorative glass container can be further enhanced.

Further, according to this constitution, since each of the thin wall portion of the lower layer, the non-forming region of the vapor-deposition layer, and the non-forming region of the decorative layer can be formed simultaneously by means of laser processing or the like, a process for production treatment can be performed in very short time, and thus economically favorable.

Further, for constituting the decorative glass container of the invention, it is preferable that the overcoat layer be prepared by including a first overcoat layer and a second overcoat layer from underneath, and the hardness of the second overcoat layer be greater than that of the first overcoat layer.

According to this constitution, not only the hard coating properties of the decorative glass can be further improved by the first overcoat layer, but also the adhesion properties to the lower layer can be further improved by the second overcoat layer.

Further, for constituting the decorative glass container of the invention, it is preferable that the lower layer be prepared by including a first lower layer and a second lower layer from underneath, and the first lower layer consists of a thermosetting resin and the second lower layer consists of a UV curable resin.

According to this constitution, not only the adhesion properties to the glass surface can be further improved by the first lower layer, but also the adhesion properties to the overcoat layer can be further improved by the second lower layer.

Further, for constituting the decorative glass container of the invention, it is preferable that a step difference part consisting of a thick wall portion and a thin wall portion be formed on the surface of the glass container and each of the thick wall portion and thin wall portion of the lower layer is formed in response to the thick wall portion and the thin wall portion on the surface of the glass container.

According to this constitution, decorative properties of the decorative glass container can be further improved or surface smoothness of the overcoat layer can be improved.

The other embodiment of the invention relates to a method for manufacturing a decorative glass container having, a lower layer including a thick wall portion and a thin wall portion, a vapor-deposition layer patterned by a forming region and a non-forming region, and an overcoat layer, on the upper part of the glass container in order, and the method includes:

(1) a step of forming entirely a lower layer on the upper part of the glass container (2) a step of forming entirely a vapor-deposition layer on the upper part of the lower layer (3) a step of removing simultaneously a part of the vapor-deposition layer and lower layer, forming a vapor-deposition layer patterned by a forming region and a non-forming region, and exposing a part of the lower layer to give a thin wall portion of the lower layer, and (4) a step of forming an overcoat layer on the upper part of the patterned vapor-deposition layer and the thin wall portion of the lower layer, and forming a contact region in which the lower layer and the overcoat layer are in direct contact with each other by way of the non-forming region of the vapor-deposition layer.

According to the above embodiment, a decorative glass container having not only improved adhesion properties of a patterned vapor-deposition layer to glass surface or the like, but also improved pattern accuracy of the vapor-deposition layer can be manufactured efficiently.

Further, for carrying out the method for manufacturing a decorative glass container of the invention, it is preferable that the step (2') for forming a decorative layer be further included between the step (2) and the step (3) and, during the step (3), each of a part of the vapor-deposition layer, lower layer, and decorative layer be simultaneously removed and a part of the lower layer is exposed to give the thin wall portion of the lower layer.

According to this embodiment, a decorative glass container with more favorable decorative properties can be manufactured efficiently.

Further, for carrying out the method for manufacturing a decorative glass container of the invention, it is preferable that the simultaneous removal of the step (3) be performed by laser processing.

According to this embodiment, a decorative glass container having a vapor-deposition layer with improved pattern accuracy can be manufactured in short time.

BRIEF DESCRIPTION OF DRAWINGS

FIGS. 7A to 7D are views that are provided to explain the manufacturing example of the decorative glass container using a conventional hot stamp foil; and FIGS. 8A to 8D are views that are provided to explain the manufacturing example of the decorative glass container using a conventional masking tape.

DETAILED DESCRIPTION

First Embodiment

Figure 1A:
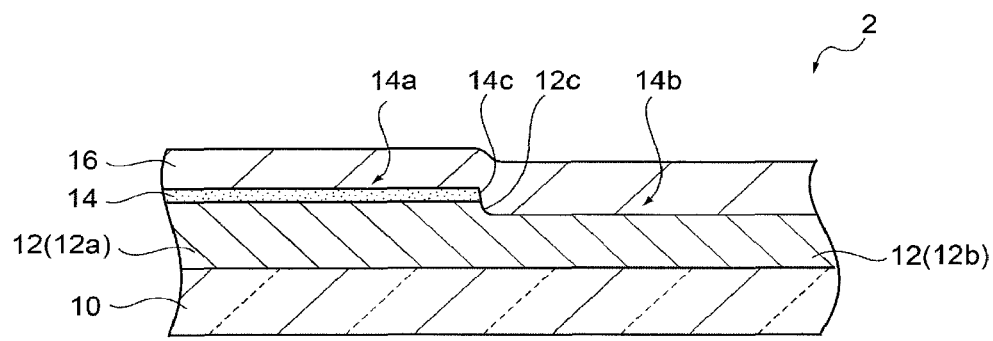
FIG. 1A is a view illustrating a basic example of a decorative glass container of the invention.

The first embodiment relates to a decorative glass container having, a lower layer including a thick wall portion and a thin wall portion, a vapor-deposition layer patterned by a forming region and a non-forming region, and an overcoat layer, on the upper part of the glass container in order, in which the forming region of the vapor-deposition layer is formed on the upper part of the thick wall portion of the lower layer and the non-forming region of the vapor-deposition layer is formed on the upper part of the thin wall portion of the lower layer, and also a contact region is formed in which the lower layer and the overcoat layer are in direct contact with each other by way of the non-forming region of the vapor-deposition layer.

Specifically, as illustrated in FIGS. 1 to 4, as a lower layer 12 consists of a thick wall portion 12a and a thin wall portion 12b, a step difference 12c is formed therebetween, and a patterned vapor-deposition layer 14 or the like is formed by laser processing or the like in response to the step difference 12c, adhesion properties between the surface or the like of a glass container 10 and the patterned vapor-deposition layer 14 or the like are improved and a clear boundary line 14c can be obtained between a forming region 14a and a non-forming region 14b of the patterned vapor-deposition layer.

Hereinafter, the decorative glass container of the first embodiment will be specifically and suitably described in view of the drawings.

FIG. 1A is a basic example of a decorative glass container 2 which has the vapor-deposition layer 14 with a predetermined pattern in response to the lower layer 12 with the step difference 12c.

Figure 1B:
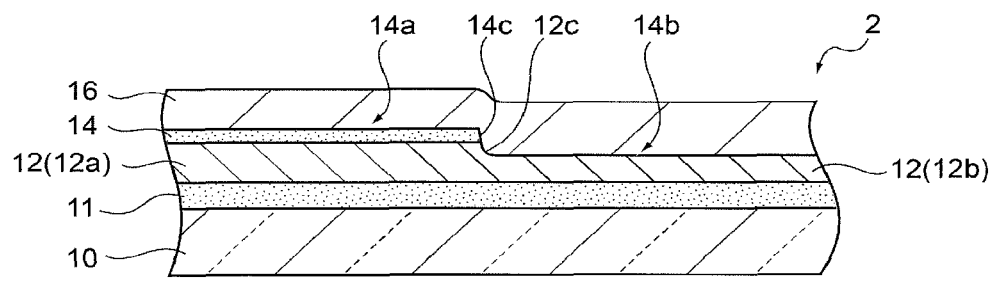
FIG. 1B illustrates a modified example of the decorative glass container which has a lower layer including a first lower layer and a second lower layer.

FIG. 1B is a modified example of the decorative glass container 2 in which the lower layer 12 with the step difference 12c consists of a substantially flat first lower layer 11 and the second lower layer 12b with the predetermined step difference 12c.

Figure 2A:
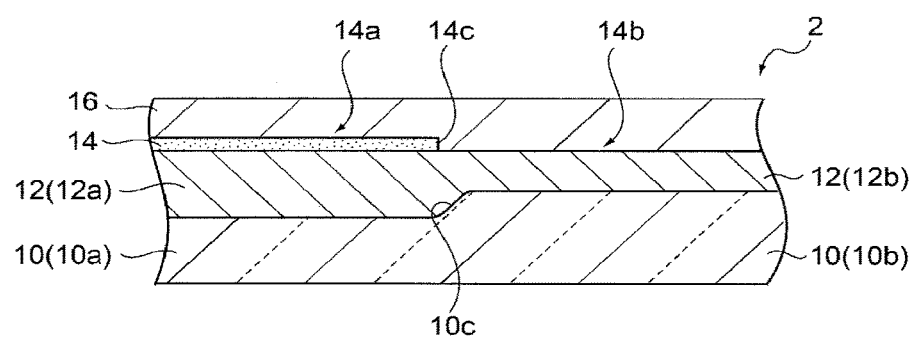
FIGS. 2A and 2B illustrate a modified example of the decorative glass container which has a predetermined step difference on the surface of each glass container.

FIG. 2A is a modified example of the decorative glass container 2 in which a thin wall portion 10a with relatively thin glass thickness at the side of the forming region 14a of the patterned vapor-deposition layer 14 is formed and a thick wall portion 10b with relatively thick glass thickness at the side of the non-forming region 14b of the patterned vapor-deposition layer 14 is formed in the glass container, and an upward-sloping step difference 10cc from the thin wall portion 10a to the thick wall portion 10b is included therebetween.

Figure 2B:
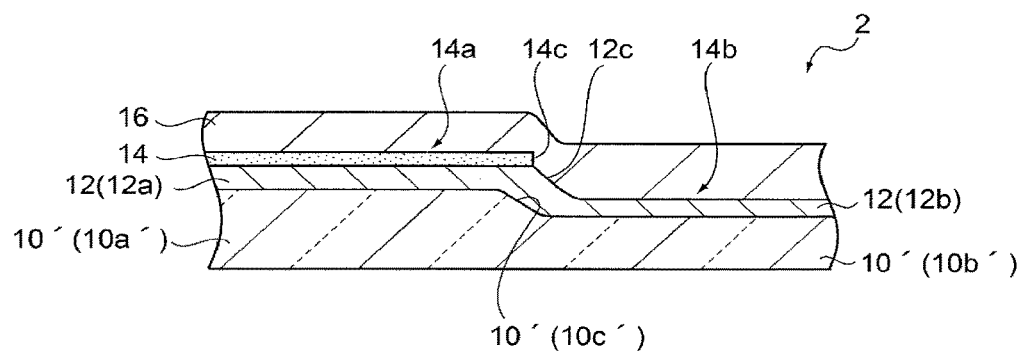

FIG. 2B is a modified example of the decorative glass container 2 in which a thick wall portion 10a' with relatively thick glass thickness at the side of the forming region 14a of the patterned vapor-deposition layer 14 is formed and a thin wall portion 10b' with relatively thin glass thickness at the side of the non-forming region 14b of the patterned vapor-deposition layer 14 is formed in the glass container, and a downward-slopping step difference 10c' from the thick wall portion 10a' to the thin wall portion 10b' is included therebetween.

Figure 3A:
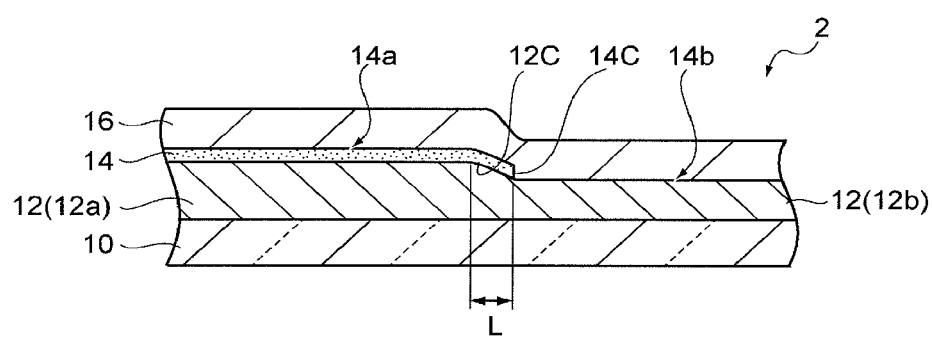
FIG. 3A illustrates a modified example of the decorative glass container in which the width of step difference is high in the lower layer.

FIG. 3A is a modified example of the decorative glass container 2 in which width (L) of the step difference 12c of the lower layer 12 is relatively long, a part of the vapor-deposition layer 14 is also formed on a tilted surface of the step difference 12c, and the boundary line 14c of the vapor-deposition layer 14 coincides with the end part of the thin wall portion 12b of the lower layer 12.

Figure 3B:
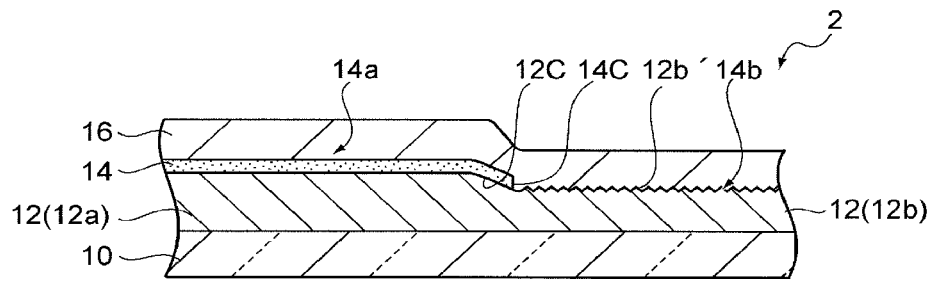
FIG. 3B illustrates a modified example of the decorative glass container in which asperities are formed on the surface of a thin wall portion of the lower layer.

FIG. 3B is a modified example of the decorative glass container 2 in which asperities 12b' are formed on the surface of the thin wall portion 12b of the lower layer 12.

Figure 4A:
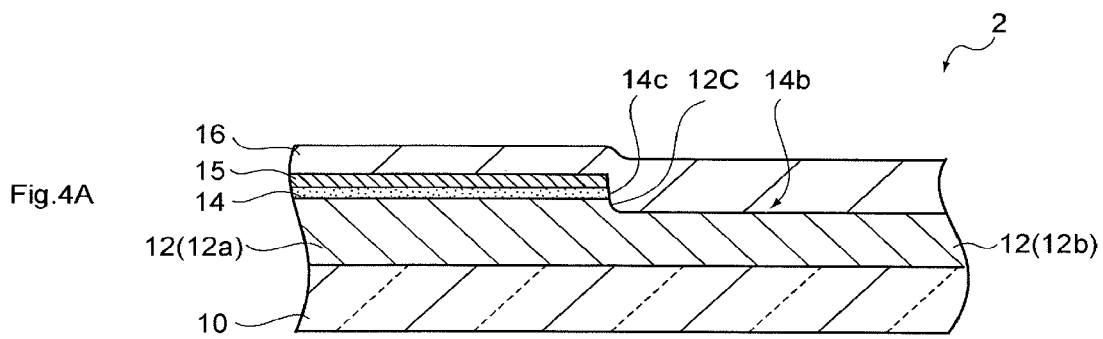
FIG. 4A illustrates a modified example of the decorative glass container having a partial decorative layer.

FIG. 4A is a modified example of the decorative glass container 2 in which a predetermined decorative layer 15 is formed on the vapor-deposition layer 14 with a predetermined pattern so as to have a partial overlap with it.

Figure 4B:
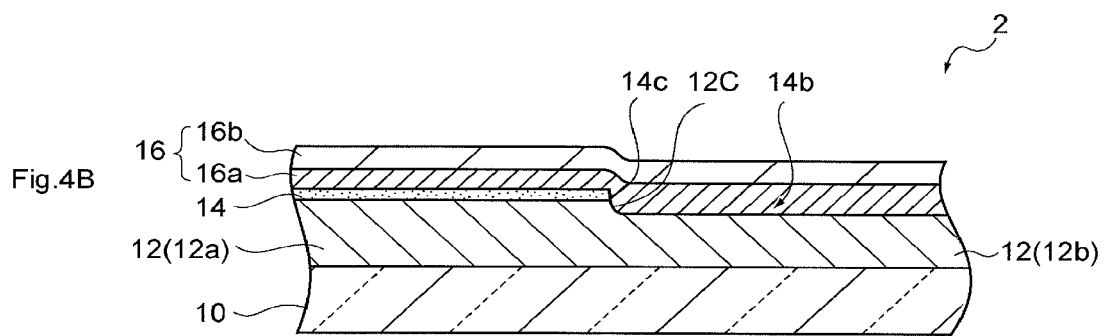
FIG. 4B illustrates a modified example of the decorative glass container having an overcoat layer which includes a first overcoat layer and a second overcoat layer.

FIG. 4B is a modified example of the decorative glass container 2 in which an overcoat layer 16 consists of a first overcoat layer 16a having excellent adhesion properties in lower part and a second overcoat layer 16b having excellent hard coating properties in upper part.

Figure 4C:
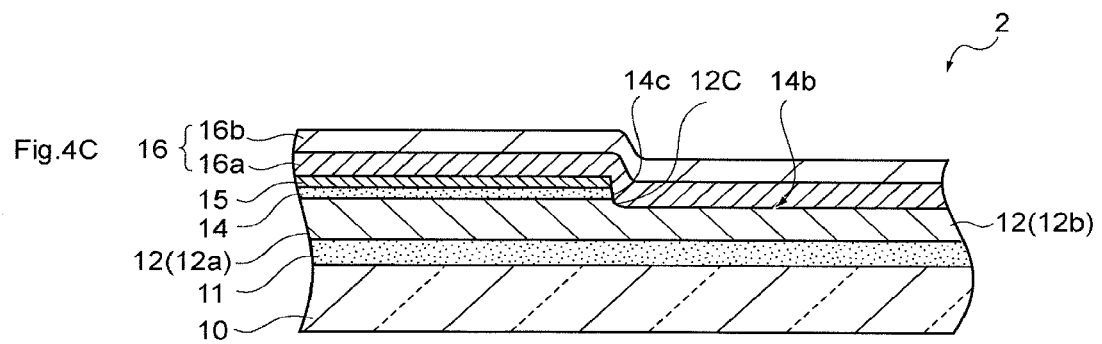
FIG. 4C illustrates a modified example of the decorative glass container having the overcoat layer which includes the first overcoat layer and the second overcoat layer, the partial decorative layer, and the lower layer which includes the first lower layer and the second lower layer.

FIG. 4C is a modified example of the decorative glass container 2 in which the overcoat layer 16 consists of the first overcoat layer 16a having excellent adhesion properties in lower part and the second overcoat layer 16b having excellent hard coating properties in upper part, the predetermined decorative layer 15 is formed partially on the vapor-deposition layer 14, and the lower layer 12 with the step difference 12c consists of the substantially flat first lower layer 11 and the second lower layer 12(12a,12b) with the predetermined step difference 12c.

1. Glass Container (1) Shape

The shape of the glass container 10, which is partially illustrated in FIG. 1A or the like, is not particularly limited. Instead, it may be suitably selected in view of the use or type of contents or the like.

Thus, from the viewpoint that the glass container is suitable for a cosmetics container or the like, preferred examples of the glass container include a bottleneck type glass bottle, a rectangular-shaped glass bottle, a cylindrical-shaped glass bottle, a heterogeneous-shaped glass bottle, a rectangular-shaped glass box, a cylindrical-shaped glass box, and a heterogeneous-shaped glass box.

(2) Thick Wall Portion of Glass Container

With regard to the shape of the glass container, it is also preferable to form the thick wall portion 10b on the outer peripheral surface as illustrated in FIG. 2A.

That is because, in the case of the glass container 10 having the thick wall portion 10b formed on outer peripheral surface as illustrated in FIG. 2A, not only decorative properties are improved when the decorative glass container 2 is constituted with it, but also the surface of the overcoat layer 16 as an outermost layer can be substantially smoothened.

Thus, although it may vary depending on a difference between the thick wall portion 12a of the lower layer 12 and the thin wall portion 12b of the lower layer 12, i.e., the height of the step difference 12c, the thick wall portion 10b is preferably formed such that the height of the step difference 12c (1 to 8 μm, in general) or total of the height of the step difference 12c and the film thickness of the vapor-deposition layer 14 (10 to 1,000 angstrom) is in the same range as the difference between the thick wall portion 10b of the glass and the thin wall portion 10b of the glass.

(3) Thin Wall Portion of Glass Container

As illustrated in FIG. 2B, it is also preferable to form the thin wall portion 10b' on the outer peripheral surface of the glass container 10'.

That is because, in the case of the glass container 10' having the thin wall portion 10b' formed on the outer peripheral surface, not only decorative properties are improved when the decorative glass container 2 is constituted with it, but also a relatively large step difference can be formed on the surface of the overcoat layer 16 as an outermost layer.

Thus, although it may vary depending on shape of the step difference formed on the surface of the overcoat layer 16, in general, it is preferable that the thin wall portion 10b' of the glass be formed such that the difference between the thick wall portion 10a' of the glass and the thin wall portion 10b' of the glass is a value which is within a range of 50 to 5,000 μm.

(4) Type

The type of the glass for constituting the glass container is not particularly limited. Examples thereof include any one of soda lime glass, borosilicate glass, lead glass, phosphate glass, and aluminosilicate glass, and a mixture of two or more of them.

(5) Coloration Properties

As for the glass container to be used, a colorless transparent glass may be used. However, a colored transparent glass or a colored semi-transparent glass may be also preferably used.

That is because, by using a colored transparent glass or a colored semi-transparent glass, in view of the coloration relationship between a cured coating film that is partially formed on an outer side and the glass container, a complex color state such as rainbow color, buprestid color, pearl luminescence (pearl shine), and scale patterns can be recognized without excessively deteriorating the distinguish properties of contents.

In addition, the type of the glass for constituting a colorless transparent glass or a colored transparent glass is not particularly limited, and examples thereof include soda lime glass, borosilicate glass, lead glass, phosphate glass, and aluminosilicate glass.

2. Lower Layer

As illustrated in FIG. 1A or the like, by having the thick wall portion 12a and the thin wall portion 12b on the surface of the decorative glass container 2, the lower layer 12 with the predetermined step difference 12c is formed therebetween.

(1) Constitutional Materials (1)-1 Type of Constitutional Materials

As for the type of constitutional materials for the lower layer, a thermosetting composition containing a polysiloxane-based resin, a melamine resin, a phenol resin, an urea resin, a guanamine resin, an epoxy resin, a polyurethane resin, a polyester resin, an acrylic resin, or derivatives thereof, or a UV curable composition consisting of an acrylate monomer or an acrylate oligomer are preferably used.

In particular, as constitutional materials for the lower layer, it is preferable to use a polyol modified formaldehyde resin (also referred to as an acrylic melamine resin) obtained by reacting a melamine resin or the like with a polyol compound, for example, an acrylic resin containing a hydroxyl group, an epoxy resin containing a hydroxyl group, a polyester resin containing a hydroxyl group, and an urethane resin containing a hydroxyl group.

The reason is that, by using this polyol modified formaldehyde resin, adhesive strength to the glass surface is improved and also smoothness or thin film property of the lower layer can be further improved.

(1)-2 Silane Coupling Agent

It is preferable to add a predetermined amount of a silane coupling agent in the constitutional materials for the lower layer, for example, in a range of O. 5 to 50 parts by weight with respect to 100 parts by weight of the constitutional materials. More preferably, it is added in a range of 5 to 40 parts by weight. Still more preferably, it is added in a range of 10 to 30 parts by weight.

The type of the silane coupling agent is not particularly limited. However, it is preferable to use y-ureidopropyl triethoxysilane, y-ureidopropyl trimethoxysilane, y-aminopropyl triethoxysilane, y-aminopropyl trimethoxysilane, y-(2-aminoethyl)aminopropyl trimethoxysilane, or y-(2-aminoethyl)aminopropylmethyl dimethoxysilane, either singly or in combination of two or more of them.

From the viewpoint of significantly improving adhesive strength to the glass surface, in particular, when an acrylic melamine resin is used as constitutional materials, it is preferable to use y-ureidopropyl triethoxysilane as a silane coupling agent.

(1)-3 UV Absorbing Agent

It is also preferable to include a UV absorbing agent in the constitutional materials for the lower layer.

The reason is that, according to this constitution, not only the UV-caused deterioration (photodegradation) of the contents inside the glass container can be effectively prevented, but also the lower layer is not deteriorated by UV rays when an overcoat layer or the like is formed of UV curable resin and cured by UV rays.

Examples of the UV absorbing agent include benzotriazoles such as 2-(2-hydroxy-3,5-di-t-amylphenyl)-2H-benzotriazole and isooctyl-3-(3-(2H-benzotriazol-2-yl)-5-t-butyl-4-hydroxyphenyl propionate, hindered amines such as succinic acid dimethyl-1-(2-hydroxyethyl)-4-hydroxy-2,2,6,6-tetramethyl piperidine polycondensation, a triazine-based absorbing agent, a salicylic acid derivative-based absorbing agent, and a benzophenone-based absorbing agent, which may be used either singly or in combination of two or more of them.

It is preferable to add the UV absorbing agent in a range of 0.005 to 10 parts by weight with respect to 100 parts by weight of the constitutional materials for the lower layer.

The reason is that, when the addition amount of the UV absorbing agent is less than 0.005 parts by weight, the UV absorbing effect is not exhibited so that contents in the glass container may be deteriorated by incident UV rays or the lower layer may be deteriorated by UV rays when the overcoat layer or the like is cured by UV rays.

On the other hand, when the addition amount of the UV absorbing agent exceeds 10 parts by weight, dispersibility or compatibility with a principle component may deteriorate.

(1)-4 Coherent Coloring Agent

It is preferable to include a coherent coloring agent in the constitutional materials for lower layer.

The reason is that, by having this constitution, laser absorbing properties can be improved and also decorative properties of the glass container can be significantly improved.

As described herein, the coherent coloring agent means a coloring agent capable of providing a color effect such as pearl luminescence (pearl shine) based on multilayer reflection of light generated by optical interference.

Specific examples thereof include flake pigments including a mica (muscovite) pigment coated with metal oxide, an alumina flake pigment coated with metal oxide, a silica flake pigment coated with metal oxide, a glass flake pigment coated with metal oxide, a titan flake pigment, a hologram pigment, and a cholesteric liquid crystal polymer, which may be used either singly or in combination of two or more of them. Further, examples of the type of metals in those pigments coated with metal oxide include titan dioxide and iron oxide as well as metal oxide of chrome, cobalt, tin, and zirconium.

Further, the addition amount of the coherent coloring agent is preferably in a range of 0.1 to 30% by weight with respect to the total amount of the lower layer (100% by weight).

The reason is that, when the addition amount of the coherent coloring agent is less than 0.1 parts by weight, a color effect such as pearl luminescence may not be exhibited.

On the other hand, when the addition amount of the coherent coloring agent exceeds 30 parts by weight, dispersibility or compatibility with a principle component may deteriorate or coating appearance may be impaired.

Thus, the addition amount of the coherent coloring agent is more preferably in a range of 0.5 to 15% by weight, and still more preferably in a range of 1.0 to 10% by weight with respect to the total amount of the lower layer (100% by weight).

(1)-5 Laser Absorbing Agent

It is preferable to include a laser absorbing agent in the constitutional materials for lower layer.

The reason is that, by including a laser absorbing agent, energy of irradiated laser is absorbed and transformed into heat energy, which can be then used for efficiently removing of a part of the lower layer or the like.

Specific examples thereof include black pigments such as carbon black (e.g., acetylene black, lamp black, thermal black, and furnace black), graphite, titan black, and black pigments such as black iron oxide, white pigments such as calcium carbonate, titan oxide, zinc oxide, zinc sulfide, and lithopone, yellow pigments such as cadmium yellow, yellow lead (chrome yellow), zinc chromate, yellow soil, and yellow iron oxide, red pigments such as red shade pigment, amber, red iron oxide, cadmium red, and lead oxide, blue pigments such as navy blue, deep blue, and cobalt blue, and green pigments such as chrome green, cobalt green, and viridian, which may be used either singly or in combination of two or more of them.

Of those, from the viewpoint of having high laser absorbing properties (absorbance), good dispersibility with constitutional materials, and favorable cost, carbon black is particularly preferable as a laser absorbing agent.

Further, the addition amount of the laser absorbing agent is preferably in a range of 0.01 to 8% by weight with respect to the total amount of the lower layer (100% by weight).

The reason is that, when the addition amount of the laser absorbing agent is less than 0.01% by weight, the laser absorbing properties are poor so that the boundary line of the vapor-deposition layer may not be clear.

On the other hand, when the addition amount of the laser absorbing agent exceeds 8% by weight, mechanical strength of the coated film on the glass container may be deteriorated.

Thus, the addition amount of the laser absorbing agent is more preferably in a range of 0.5 to 5.0% by weight, and still more preferably in a range of 1.0 to 3.0% by weight with respect to the total amount of one layer in the lower layer (100% by weight).

(1)-6 Additives

If required, a compatabilizing agent, a flame retardant, a filler (glass fiber, carbon fiber, metallic filler, or the like), a stabilizing agent (fatty acid metal salts, anti-oxidizing agent, or the like), a lubricating agent, a dispersant, a foaming agent, an anti-microbial agent or the like may be preferably included in the constitutional materials of the lower layer.

(2) Average Thickness

It is also preferable that the average thickness of the thick wall portion of the lower layer is in a range of 2 to 120 μm and the average thickness of the thin wall portion of the lower layer is in a range of 1 to 90 μm.

The reason is that, with the average thicknesses of the thick wall portion and thin wall portion, a predetermined step difference is obtained so that good adhesion properties are easily obtained between the overcoat layer and the lower layer (thin wall portion) as the non-forming region of the vapor-deposition layer.

In addition, another reason is that, when this predetermined step difference is obtained, favorable decorative properties are easily obtained for the decorative glass container as a whole.

Thus, it is more preferable that the average thickness of the thick wall portion of the lower layer is in a range of 10 to 100 μm and the average thickness of the thin wall portion of the lower layer is in a range of 2 to 50 μm.

Further, it is still more preferable that the average thickness of the thick wall portion of the lower layer is in a range of 15 to 50 μm and the average thickness of the thin wall portion of the lower layer is in a range of 8 to 30 μm.

(3) Composite Layer

As illustrated in FIG. 1B or FIG. 4C, it is preferable that the lower layer 12 be a composite layer prepared by including the first lower layer 11 and the second lower layer 12 from underneath, and the first lower layer 11 consist of a thermosetting resin such as an acrylic melamine resin described above and the second lower layer 12 consist of a UV curable resin.

The reason is that, by having this constitution, not only the adhesion properties to the surface of the glass container can be improved by the first lower layer, but also the adhesion properties to the overcoat layer can be improved by the second lower layer.

Further, for this composite layer, at least one layer (second lower layer) may contain a laser absorbing agent.

Thus, based on a difference in laser energy absorbing properties between a layer containing a laser absorbing agent and a layer containing relatively small addition amount of a laser absorbing agent or no laser absorbing agent, a thick wall portion or a thin wall portion can be more easily formed by laser processing.

(3)-1 First Lower Layer

As illustrated in FIG. 1B or the like, the thermosetting resin constituting the first lower layer 11 preferably contains a polysiloxane-based resin, a melamine resin, a phenol resin, an urea resin, a guanamine resin, an epoxy resin, a polyurethane resin, a polyester resin, an acrylic resin, or derivatives thereof as a constitutional material.

Further, by containing a polyol modified formaldehyde resin (an acrylic melamine resin) obtained by reacting a melamine resin or the like with a polyol compound, for example, an acrylic resin containing a hydroxyl group, an epoxy resin containing a hydroxyl group, a polyester resin containing a hydroxyl group, and an urethane resin containing a hydroxyl group, not only the adhesion properties to the glass surface are improved, but also adhesion properties to the second lower layer consisting of a UV curable resin, which is formed thereon, can be further improved.

More specifically, it is preferable to have a polyol modified formaldehyde resin (an acrylic melamine resin) obtained by adding an acryl polyol compound and a lactone polyol compound, each in a range of 50 to 300 parts by weight and 5 to 100 parts by weight, respectively, with respect to 100 parts by weight of the melamine resin.

In addition, it is preferable to add a curing agent (including a curing catalyst, the same shall apply hereinafter) when a polysiloxane-based resin or a melamine resin is used.

Examples of the curing agent include platinum, dibutyl tin, oxalic acid dimethyl ester, oxalic acid diethyl ester, maleic anhydride, phthalic anhydride, sodium monochloroacetate, potassium monochloroacetate, a,a-dichlorohydrin, ethylamine hydrochloride, triethanolamine hydrochloride, ammonium chloride, ammonium sulfate, ammonium chloride salt, ammonium sulfate salt, urea derivatives, and imide diammonium sulfate, which may be used either singly or in combination of two or more of them.

Furthermore, the addition amount of the curing agent is preferably in a range of 0.1 to 30 parts by weight with respect to 100 parts by weight of the principle component.

The reason is that no addition effect may be expressed when the addition amount of the curing agent is less than 0.1 parts by weight. On the other hand, when the addition amount of the curing agent exceeds 30 parts by weight, the reactivity of the principle component may be difficult to control.

(3)-2 Second Lower Layer

Further, as illustrated in FIG. 1B or the like, it is preferable that the second lower layer 12 consist of a UV curable resin or the like, in the same manner as the lower layer as a monolayer described above, and it has a thickness in a range of 5 to 10 μm and transparency.

The reason is that, according to this embodiment, it is in direct contact with the overcoat layer by way of the non-forming region of the patterned vapor-deposition layer, thus exhibiting good adhesion properties.

In addition, another reason is that, when the second lower layer consists of a UV curable resin or the like having transparency, contents in the glass container can be easily identified.

Accordingly, a UV curable type application liquid is preferably prepared by having a blend composition in which, with respect to the total amount of the second lower layer (100% by weight), 10 to 40% by weight of an acrylate oligomer having a weight average molecular weight of 1,000 to 10,000 (including a methacrylate oligomer), 1 to 10% by weight of an acrylate monomer having a weight average molecular weight of less than 1,000 (including methacrylate), 1 to 10% by weight of an acrylic resin having a weight average molecular weight of at least 50,000 (including a methacrylic resin), 0.1 to 3% by weight of a photopolymerization initiator, and remaining amount of an organic solvent are contained.

As described herein, examples of the acrylate oligomer having a weight average molecular weight of 1,000 to 10,000, more preferably 3,000 to 8,000, include at least one of a urethane acrylate oligomer, a polyester acrylate oligomer, and an epoxyurethane acrylate oligomer.

In particular, a urethane acrylate oligomer with a polycarbonate skeleton, a urethane acrylate oligomer with a polyester skeleton, and a urethane acrylate oligomer with a polycaprolactone skeleton are preferable.

Further, examples of the acrylate monomer having a weight average molecular weight of less than 1,000 include cyclohexyl acrylate, tetrahydrofurfuryl acrylate, isobutyl acrylate, benzyl acrylate, ethylcarbitol acrylate, 2-ethylhexyl acrylate, methoxyethyl acrylate, methoxypolyethylene glycol acrylate, butoxyethyl acrylate, butoxypolyethylene glycol acrylate, phenoxyethyl acrylate, nonylphenoxyethyl acrylate, phenoxypolyethylene glycol acrylate, 3-chloro-2-hydroxypropyl acrylate, 2-hydroxy-3-phenoxypropyl acrylate, 2-hydroxybutyl acrylate, diethylene glycol monoacrylate, dipropylene glycol monoacrylate, polyethylene glycol monoacrylate, polypropylene glycol monoacrylate, trifluoroethyl acrylate, dicyclopentadiene acrylate, isobornyl acrylate, dicyclopentenyl oxyalkyl acrylate, dicyclopentanyl acrylate, tricyclodecanyl acrylate, and tricyclodecanyloxyethyl acrylate, which may be used either singly or in combination of two or more of them.

Further, for having a hard coating property or the like, it is preferable to have an acrylate monomer mixture containing a polyfunctional acrylate monomer having a weight average molecular weight of less than 1,000.

Examples of the polyfunctional acrylate monomer include 1,4-butanedioldi(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypyvalic acid neopentyl glycol di(meth)acrylate, dicyclopentanyl di(meth)acrylate, caprolactone modified dicyclopentenyl di(meth)acrylate, EO modified di(meth)acrylate phosphate, allylated cyclohexyl di(meth)acrylate, isocyanurate di(meth)acrylate, trimethylolpropane tri(meth)acrylate, dipentaerythritol tri(meth)acrylate, pentaerythritol tri(meth)acrylate, PO modified trimethylolpropane tri(meth)acrylate, tris(acryloxyethyl)isocyanurate, dipentaerythritol penta(meth)acrylate, dipentaerythritol hexa(meth)acrylate, and caprolactone modified dipentaerythritol hexa(meth)acrylate, which may be used either singly or in combination of two or more of them.

Further, examples of the acrylic resin having a weight average molecular weight of at least 50,000, and more preferably in a range of 60,000 to 150,000 include an acrylic resin which is soluble in the acrylate oligomer or the acrylate monomer described above, and it is preferably an acrylic polymer in powder form which is derived from at least one monomer component including methyl methacrylate, ethyl methacrylate, propyl methacrylate, isooctyl methacrylate, 2-hydroxyethyl methacrylate, 2-hydroxypropyl methacrylate, methacryl amide, hydroxymethacryl amide, acrylic acid, methyl acrylate, ethyl acrylate, propyl acrylate, isooctyl acrylate, 2-hydroxyethyl acrylate, 2-hydroxypropyl acrylate, acryl amide, and hydroxyacryl amide.

(4) Step Difference

With regard to the step difference 12c of the lower layer 12 illustrated in FIG. 1A, it is preferable that the value (height) of the step difference 12c to be formed be in a range of 0.1 to 30 μm by controlling each of the average thickness (t1) of the thick wall portion 12a and the average thickness (t2) of the thin wall portion 12b in the lower layer 12.

The reason is that, when the step difference is less than 0.1 μm, it may be difficult to be formed with good accuracy.

On the other hand, the reason is that, when the step difference exceeds 30 μm, the thickness of the thick wall portion also increases relatively, and as a result, there is a case in which it becomes difficult to form evenly a thick wall portion including the step difference.

Accordingly, it is more preferable that the step difference to be formed be in a range of 0.5 to 15 µm. It is still more preferable that the step difference to be formed be in a range of 1 to 8 µm.

Further, when the step difference is formed by cutting (etching) by laser processing or the like, it is preferably in a range of 1/10 to 9/10 of the initial thickness of the lower layer 12, i.e., the average thickness (t1) of the thick wall portion 12a. More preferably, it is in a range of 2/10 to 8/10. Still more preferably, it is in a range of 3/10 to 7/10.

As illustrated in FIG. 3A, it is also preferable that the width (L) of the step difference 12c in the lower layer 12 be in a range of 1 to 20,000 µm.

The reason is that, when the width of the step difference is less than 1 µm, it may be difficult to be formed with good accuracy or decorative properties may be impaired.

On the other hand, the reason is that, when the width of the step difference exceeds 20,000 µm, the tilted surface becomes excessively smooth so that the decorative properties may be relatively lowered.

Accordingly, it is preferable that the width of the step difference to be formed be in a range of 10 to 10,000 µm. More preferably, it is in a range of 100 to 5,000 µm.

(5) Surface Roughness

As illustrated in FIG. 3B, it is also preferable to form the asperities 12b' on surface of the thin wall portion 12b of the lower layer 12.

The reason is that, by having the asperities 12b', the surface area which is in contact with the overcoat layer 16 becomes large so that the adhesion properties between the lower layer 12 and the overcoat layer 16 is improved and also the adhesion properties to the patterned vapor-deposition layer 14 is improved.

Thus, the surface roughness (Rz) of the asperities 12b' is preferably in a range of 0.1 to 5 µm. More preferably, it is in a range of 0.5 to 3 µm. Still more preferably, it is in a range of 0.8 to 2 µm.

Further, the surface roughness (Rz) may be adjusted by blast treatment or abrasion treatment or the like. However, it is also possible to adjust the surface roughness (Rz) by controlling such as laser output or processing time when a vapor-deposition layer or a lower layer is formed by laser processing described below.

3. Patterned Vapor-Deposition Layer

As illustrated in FIG. 1A or the like, instead of having entirely a vapor-deposition layer, the vapor-deposition layer 14 having a predetermined pattern (patterned vapor-deposition layer) consisting of the forming region 14a and the non-forming region 14b is formed.

The forming region 14a of the vapor-deposition layer is formed on the upper part of the thick wall portion 12a of the lower layer 12 while the non-forming region 14b of the vapor-deposition layer is formed on the upper part of the thin wall portion 12b of the lower layer 12.

The embodiment of the patterned vapor-deposition layer is not particularly limited. However, the outer appearance is preferably has a predetermined pattern like a line shape, a wave shape, a circle shape, a semi-circle shape, a polygon shape, and a heterogeneous shape.

4. Decorative Layer

As illustrated in FIGS. 4A and 4C, it is also preferable that a patterned decorative layer 15 is additionally formed between the patterned vapor-deposition layer 14 and overcoat layer 16 while the patterned decorative layer is overlapped with the patterned vapor-deposition layer 14.

The reason is that, by forming a patterned decorative layer consisting of letters, diagrams, symbols, or the like, color or shape can be created so that decorative properties of the decorative glass container can be further improved.

Further, according to such embodiment of the decorative layer, the thin wall portion of the lower layer, the non-forming region of the vapor-deposition layer, and the non-forming region of the decorative layer can be formed simultaneously by laser processing or the like, and therefore it is advantageous in terms of manufacture.

Further, the decorative layer consists of a thermosetting resin or a UV curable resin or the like, and for example, it is preferable to have a UV curable type application liquid having a blend composition which contains, with respect to the total amount of the decorative layer (100% by weight), 2 to 10% by weight of an acrylate oligomer having a weight average molecular weight of 1,000 to 10,000, 10 to 40% by weight of an acrylate monomer having a weight average molecular weight of less than 1,000, 3 to 15% by weight of an acrylic resin having a weight average molecular weight of at least 50,000, 0.1 to 3% by weight of a photopolymerization initiator, 0.1 to 3% by weight of a coloring agent, and remaining amount of an organic solvent.

If required, a compatabilizing agent, a flame retardant, a filler (glass fiber, carbon fiber, metallic filler, or the like), a stabilizing agent (fatty acid metal salts, anti-oxidizing agent, or the like), a lubricating agent, a dispersant, a foaming agent, an anti-microbial agent or the like may be preferably included in the decorative layer.

As for the acrylate oligomer having a weight average molecular weight of 1,000 to 10,000, acrylate monomer having a weight average molecular weight of less than 1,000, and acrylic resin having a weight average molecular weight of at least 50,000, the same type as the constitutional materials for forming the second lower layer described above can be also used.

However, to provide the vapor-deposition layer with a protective property by the decorative layer, as an acrylate monomer having a weight average molecular weight of less than 1,000, an acrylate monomer mixture obtained by mixing a polyfunctional acrylate monomer in an amount of 50% by weight or more, and more preferably in an amount of 60 to 98% by weight, with respect to the total amount of the acrylate monomer, is preferably used.

5. Overcoat Layer

As illustrated in FIG. 1A or the like, the overcoat layer 16 is formed on the upper part of the patterned vapor-deposition layer 14 and the lower layer 12 and overcoat layer 16 are in direct contact with each other by way of the non-forming region 14b of the vapor-deposition layer 14.

In other words, since the overcoat layer is in direct contact with the thin wall portion of the lower layer but not with a glass surface, the adhesion properties between the overcoat layer and lower layer can be improved, and also the adhesion properties between the patterned vapor-deposition layer and lower layer can be improved.

Further, the embodiment of the overcoat layer is not particular limited. As illustrated in FIG. 1A or the like, it may be the overcoat layer 16 of a single layer. However, as illustrated in FIG. 4B or FIG. 4C, it is also possible to constitute the overcoat layer 16 (16a, 16b) consisting of multi-layers.

Specifically, it is prepared by including the first overcoat layer 16a and the second overcoat layer 16b from underneath, and the hardness of the second overcoat layer is preferably greater than that of the first overcoat layer.

The reason is that, by constituting a composite layer, the hard coating properties of the decorative glass container can be improved by the first overcoat layer and the adhesion properties to the lower layer can be further improved by the second overcoat layer.

Thus, while constituting the first overcoat layer with a UV curable resin, it is preferable to have a UV curable type application liquid having a blend composition which contains, with respect to the total amount (100% by weight), 5 to 30% by weight of an acrylate monomer having a weight average molecular weight of less than 1,000, 5 to 30% by weight of an acrylic resin having a weight average molecular weight of at least 50,000, 0.1 to 3% by weight of a photopolymerization initiator, 0.1 to 3% by weight of a leveling agent, and remaining amount of an organic solvent.

As for the acrylate monomer having a weight average molecular weight of less than 1,000 and acrylic resin having a weight average molecular weight of at least 50,000, the same type as the constitutional materials for forming the second lower layer described above can be also used.

However, to further improve the adhesion properties to the lower layer (the first lower layer) in contact region, as a UV curable resin for the first overcoat layer, an acrylate monomer mixture obtained by mixing a polyfunctional acrylate monomer in an amount of 50% by weight or more, and more preferably in an amount of 60 to 98% by weight, with respect to the total amount of the acrylate monomer is preferably used as an acrylate monomer having a weight average molecular weight of less than 1,000.

Further, while constituting the second overcoat layer with a UV curable resin, it is preferable to have a UV curable type application liquid having a blend composition which contains, with respect to the total amount (100% by weight), 2 to 10% by weight of an acrylate oligomer having a weight average molecular weight of 1,000 to 10,000, 10 to 40% by weight of an acrylate monomer having a weight average molecular weight of less than 1,000, 3 to 15% by weight of an acrylic resin having a weight average molecular weight of at least 50,000, 0.1 to 3% by weight of a photopolymerization initiator, and remaining amount of an organic solvent.

Further, as for the acrylate oligomer having a weight average molecular weight of 1,000 to 10,000, acrylate monomer having a weight average molecular weight of less than 1,000, and acrylic resin having a weight average molecular weight of at least 50,000, the same type as the constitutional materials for forming the second lower layer described above can be also used.

However, to further improve the adhesion properties between the second overcoat layer and the first overcoat layer and also to improve a predetermined hard coating property, it is preferable that, as a UV curable resin for the second overcoat layer, a polyfunctional acrylate oligomer is used as a principle component of the acrylate oligomer having a weight average molecular weight of 1,000 to 10,000, and as an acrylate monomer having a weight average molecular weight of less than 1,000, an acrylate monomer mixture obtained by mixing a polyfunctional acrylate monomer in an amount of 50% by weight or more, and more preferably in an amount of 60 to 98% by weight is preferably used.

Second Embodiment

The second embodiment of the invention relates to a method for manufacturing a decorative glass container having, a lower layer including a thick wall portion and a thin wall portion, a vapor-deposition layer patterned by a forming region and a non-forming region, and an overcoat layer, on the upper part of the glass container in order, which includes:

(1) a step of forming entirely a lower layer on the upper part of the glass container (2) a step of forming entirely a vapor-deposition layer on the upper part of the lower layer (3) a step of removing simultaneously a part of the vapor-deposition layer and lower layer, forming a vapor-deposition layer patterned by a forming region and a non-forming region, and exposing a part of the lower layer to give a thin wall portion of the lower layer, and (4) a step of forming an overcoat layer on the upper part of the patterned vapor-deposition layer and the thin wall portion of the lower layer, and forming a contact region in which the lower layer and the overcoat layer are in direct contact with each other by way of the non-forming region of the vapor-deposition layer.

Figure 5:
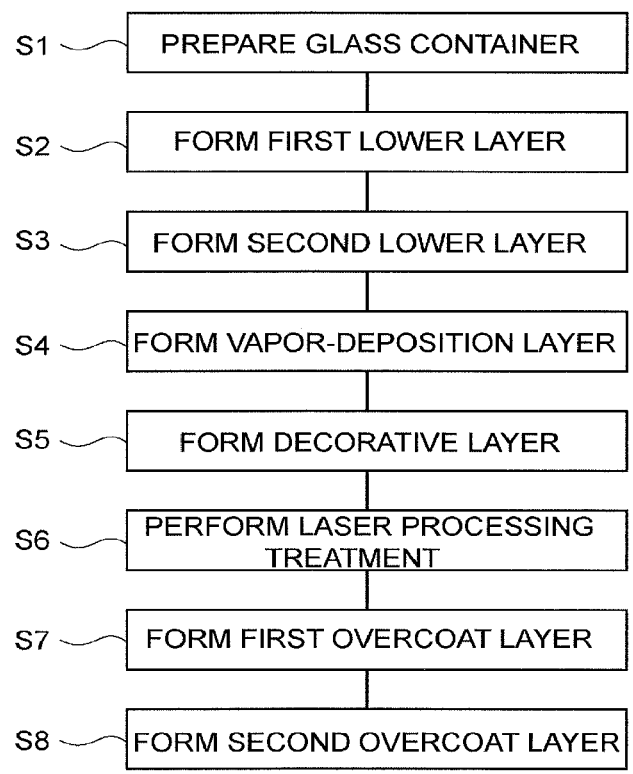
FIG. 5 is a flowchart illustrating the process for manufacturing the decorative glass container of the invention.

Specifically, to carry out the above steps (1) to (4), the decorative glass container is preferably manufactured by specifically including the steps S1 to S8 as illustrated in FIG. 5.

Herein below, explanations are given for the method for manufacturing a decorative glass container with reference to an exemplary case in which the first lower layer and the second lower layer are formed as a lower layer and also the first overcoat layer and the second overcoat layer are formed as an overcoat layer.

1. Step for Preparing Glass Container

It is a step for preparing a predetermined glass container as illustrated in S1 of FIG. 5.

Because the same glass container as those explained in the first embodiment can be prepared for S1 of FIG. 5, no further explanations are given herein.

2. Step for Forming the First Lower Layer

It is a step for forming the first lower layer as illustrated in S2 of FIG. 5, and it includes a step of applying application liquid consisting of a thermosetting composition or a UV curable composition on a glass container and a step of curing the first lower layer.

(1) Coating Step

For carrying out the invention, it is preferable that application liquid consisting of a thermosetting composition or a UV curable composition is coated on a glass container by having a coating step.

Here, examples of the process of coating the thermosetting composition or the like include, but not specifically limited to, an electrostatic coating method, an electrodeposition-coating method, a roll-coater method, an air-spraying method, an airless-spraying method, and a curtain-flow-coater method.

Among these coating methods, the electrostatic coating or air-spraying method is more preferably used in that it is possible to make a thinner film and the curved surface of glass could be uniformly coated, while the structure of a coating device is simple.

Because the same application liquid as those explained in the first embodiment can be used as application liquid for forming the first lower layer, no further explanations are given herein.

(2) Curing Step for the First Lower Layer

Subsequently, it is preferable to cure the first lower layer consisting of coated thermosetting composition or UV curable composition by heating or UV radiation or the like.

Curing conditions (baking condition) in the curing step could be suitably modified depending on the reactivity of a thermosetting composition used. In general, it is preferably carried out under the conditions of 140° C. to 250° C. for 1 to 120 minutes, more preferably under the conditions of 150° C. to 230° C. for 5 to 60 minutes, still more preferably under the conditions of 160° C. to 220° C. for 10 to 30 minutes.

When the thermosetting composition is a paint to be dried at normal temperature, it is preferable to dry at room temperature for one day to seven days, more preferably two days to four days.

Furthermore, when the UV curable composition is used, the amount of UV exposure is, for example, in a range of 50 to 1,000 mJ/cm² in order to form the first lower layer.

3. Step for Forming the Second Lower Layer

It is a step for forming the second lower layer on top of the first lower layer as illustrated in S3 of FIG. 5, and it includes a step of applying, for example, a transparent UV curable type application liquid and a step of forming the second lower layer entirely over the first lower layer by a UV radiation treatment.

As such, as described in relation to the first embodiment, a UV curable type application liquid for the second lower layer containing a predetermined polyfunctional acrylate oligomer in an amount of 50% by weight or more is coated and UV radiation is performed such that the amount of the UV radiation is preferably 100 to 800 ml/cm² UV radiation is more preferably performed such that the amount of the UV radiation is 300 to 500 mJ/cm²

4. Step for Forming Vapor-Deposition Layer

It is a step of forming a vapor-deposition layer on the second lower layer or the like as illustrated in S4 of FIG. 5.

The step for forming the vapor-deposition layer is a step for forming a metal vapor-deposition layer entirely over the second lower layer by using a vacuum vapor-deposition apparatus (including a sputtering apparatus).

More specifically, a metal vapor-deposition film with a thickness of 10 to 100 angstrom is preferably formed of a metallic substance (including metallic oxide substance) like aluminum, copper-containing aluminum, copper, silver, nickel, chrome, iron, and silicon oxide under vacuum condition with vacuum level of $1\times10^{-2}$ to $1\times10^{-5}$ Pa using a vacuum vapor-deposition apparatus.

5. Step for Forming Decorative Layer

Although it is an optional step, a step of forming a decorative layer is a step for forming a decorative layer entirely over the vapor-deposition layer by a UV radiation treatment using a colored UV curable resin, as illustrated in S5 of FIG. 5.

As such, as described in relation to the first embodiment, a UV curable type application liquid for the decorative layer containing a predetermined coloring agent and also a polyfunctional acrylate monomer in an amount of 50% by weight or more with respect to the total amount of the acrylate monomer is coated and UV radiation is performed such that the amount of the UV radiation is preferably 100 to 800 mJ/cm². UV radiation is more preferably performed such that the amount of the UV radiation is 300 to 500 mJ/cm².

6. Laser Processing Step

As illustrated in S6 of FIG. 5, the laser processing step is a step including simultaneous etching a part of the second lower layer (thin wall portion), a part of the vapor-deposition layer (non-forming region), and a part of the decorative layer (non-forming region) and exposing a part of the second lower layer (thin wall portion).

Herein below, preferred type of layer, laser processing time, laser focal length, laser processing temperature (atmospheric temperature), and output of laser device are explained specifically.

(1) Type of Laser

Type of laser can be suitably selected in consideration of film thickness of the lower layer (second lower layer), vapor-deposition layer, or decorative layer, and type, light absorbing property, and addition amount of a laser absorbing agent, or the like.

Examples thereof include YAG laser, $CO_2$ laser, $YVO_4$ laser, Ar laser, excimer laser, and semi-conductor laser.

In particular, from the viewpoint of having versatility, high output in every angle, and also fast processing speed, it is more preferable to use $CO_2$ laser.

Meanwhile, from the viewpoint of having high versatility and causing less damage to a glass container as a base, it is also preferable to perform laser radiation several times by using YAG laser.

It is also preferable that the thin wall portion of the lower layer (the second lower layer) is formed by using $CO_2$ laser and YAG laser in combination.

For example, $CO_2$ laser and YAG laser may be irradiated simultaneously, or a process of irradiating $CO_2$ laser followed by YAG laser radiation may be repeated, or it is also preferable to perform a process including irradiating $CO_2$ laser several times with varying $CO_2$ laser strength followed by YAG laser radiation.

The reason is that, according to such process, damages of a glass container as a base for coating film can be reduced.

Further, when the radiation time for $CO_2$ laser is t1 (sec) and radiation time for YAG laser is t2 (sec), ratio of t1 radiation time to entire radiation time is preferably in a range of 0.1 to 30%.

The reason is that, according to such embodiment, damages of a glass container as a base for the lower layer (the second lower layer) can be surely reduced.

More specifically, when the ratio of radiation time for $CO_2$ laser is less than 0.1% to the entire radiation time, the processing time is extended, although it may vary depending on type or thickness and the like of the lower layer (the second lower layer).

On the other hand, when the ratio of radiation time for $CO_2$ laser is more than 30%, damages may easily occur, for example, a crack is formed on the surf ace of a glass container as a base.

As such, ratio of the radiation time for $CO_2$ laser radiation (t1) to the entire radiation time is more preferably in a range of 0.5 to 25%, and still more preferably in a range of 1 to 20%.

(2) Processing Time

Laser processing time per unit area is preferably in a range of 0.05 sec to 180 sec (per 1 cm²) in consideration of type of laser, film thickness of the lower layer (second lower layer), type, light absorbing property, and addition amount of a laser absorbing agent, or the like.

The reason is that, when the laser processing time is less than 0.05 sec per glass container, the laser radiation amount is excessively low so that forming the non-forming region of the vapor-deposition layer or thin wall portion of the lower layer (second lower layer) may become difficult to achieve.

On the other hand, when the laser processing time exceeds 180 sec, the laser radiation amount is excessively high so that it becomes difficult to control the size of the non-forming region of the vapor-deposition layer or thickness of the thin wall portion of the lower layer (second lower layer), yielding lower pattern accuracy.

As such, the laser processing time per unit area is more preferably in a range of 0.1 to 120 sec. Still more preferably, it is in a range of 0.5 to 60 sec.

(3) Focal Length

Focal length of laser is preferably in a range of 50 to 500 mm in consideration of film thickness of the lower layer (second lower layer), and type, light absorbing property, and addition amount of a laser absorbing agent, or the like.

The reason is that, when the focal length of laser is less than 50 mm, it becomes difficult to control the size of the non-forming region of the vapor-deposition layer or thickness of the thin wall portion of the lower layer (second lower layer), yielding lower pattern accuracy.

On the other hand, when the focal length exceeds 500 mm, the time for forming the non-forming region of the vapor-deposition layer or thin wall portion of the lower layer (second lower layer) may become excessively long.

As such, it is more preferable that the focal length of laser is in a range of 80 to 300 mm. Still more preferably, it is in a range of 100 to 200 mm.

(4) Processing Temperature

The atmospheric temperature for laser processing is preferably in a range of 15 to 70° C. The reason is that, when the atmospheric temperature is lower than 15° C., the heat energy applied to of the lower layer (second lower layer) by laser radiation is absorbed by cold external air so that the laser processing may not be efficiently carried out.

On the other hand, when it is higher than 70° C., accuracy of laser radiation location may be lowered or heat energy may easily remain on a region received the laser radiation, and thus lowering the pattern accuracy.

As such, the atmospheric temperature for laser processing is more preferably in a range of 20 to 60° C. Still more preferably, it is in a range of 25 to 50° C.

(5) Output

Output of the laser apparatus for laser processing is preferably in a range of 5 to 500 W in consideration of film thickness of the lower layer (second lower layer), and type, light absorbing property, and addition amount of a laser absorbing agent, or the like.

The reason is that, when the output of the laser apparatus is less than 5 W, heat energy generation by laser radiation is excessively small so that the laser processing may not be efficiently carried out.

On the other hand, when the output of the laser apparatus exceeds 500 W, the laser radiation amount is excessively high so that it becomes difficult to control the size of the non-forming region of the vapor-deposition layer or thickness of the thin wall portion of the lower layer (second lower layer), yielding lower pattern accuracy.

As such, the output of the laser apparatus is more preferably in a range of 10 to 200 W. It is still more preferably in a range of 30 to 80 W.

7. Step for Forming the First Overcoat Layer

As illustrated in S7 of FIG. 5, the step for forming the first overcoat layer is a step for forming an overcoat layer as an intermediate layer which is in direct contact with the second lower layer. For example, it is a step for forming an overcoat layer as a relatively soft intermediate layer (pencil hardness of lower than 2H, in which the pencil hardness is measured based on JIS K 5400), which has relatively lower pencil hardness than the second overcoat layer formed later.

As such, as described above the first embodiment, a UV curable type application liquid for the first overcoat layer containing a predetermined amount of an acrylate monomer and an acrylic resin is coated and UV radiation is performed such that the amount of the UV radiation is preferably 100 to 500 mJ/cm$^2$ UV radiation is more preferably performed such that the amount of the UV radiation is 300 to 500 mJ/cm$^2$.

8. Step for Forming the Second Overcoat Layer

As illustrated in S8 of FIG. 5, the step for forming the second overcoat layer is a step for forming, on top of the first overcoat layer, an overcoat layer as an outermost layer which is transparent and has pencil hardness of at least 2H and more preferably 3H or more, in which the pencil hardness is measured based on JIS K 5400.

As such, as described above the first embodiment, a UV curable type application liquid for the second overcoat layer containing a polyfunctional acrylate monomer in an amount of 50% by weight or more with respect to the total amount of the acrylate monomer is coated and UV radiation is performed such that the amount of the UV radiation is preferably 100 to 1,000 mJ/cm$^2$ UV radiation is more preferably performed such that the amount of the UV radiation is 200 to 800 mJ/cm$^2$.

EXAMPLES

Hereinafter, the content of the present invention will be described in more detail with reference to examples below. However, the technical scope of the present invention could be, but not limited to the descriptions of only these examples, suitably modified within the scope of the object of the present invention.

Example 1

1. Manufacturing Decorative Glass Container
(1) Formation of the First Lower Layer To a mixing vessel equipped with a stirrer, the following addition materials were added and stirred for 30 minutes (rotational speed: 1,000 rpm) at room temperature to obtain a composition for the first lower layer having a viscosity of 40 mPa·s (25° C.).

| | |
|---|---|
| Melamine resin | 100 parts by weight |
| Acrylic polyol compound (hydroxyl number of 300 mgKOH/g, number average molecular weight of 3,000) | Acrylic polyol compound |
| Lactone polyol compound (hydroxyl number of 200 mgKOH/g, number average molecular weight of 1,000) | 30 parts by weight |
| Ureidopropyl triethoxysilane | 25 parts by weight |
| Phosphate-based cuing catalyst | 5 parts by weight |
| White pearl pigment | 5 parts by weight |
| Xylene | 300 parts by weight |
| Butyl acetate | 150 parts by weight |
| Isopropyl alcohol | 90 parts by weight |

Figure 6:
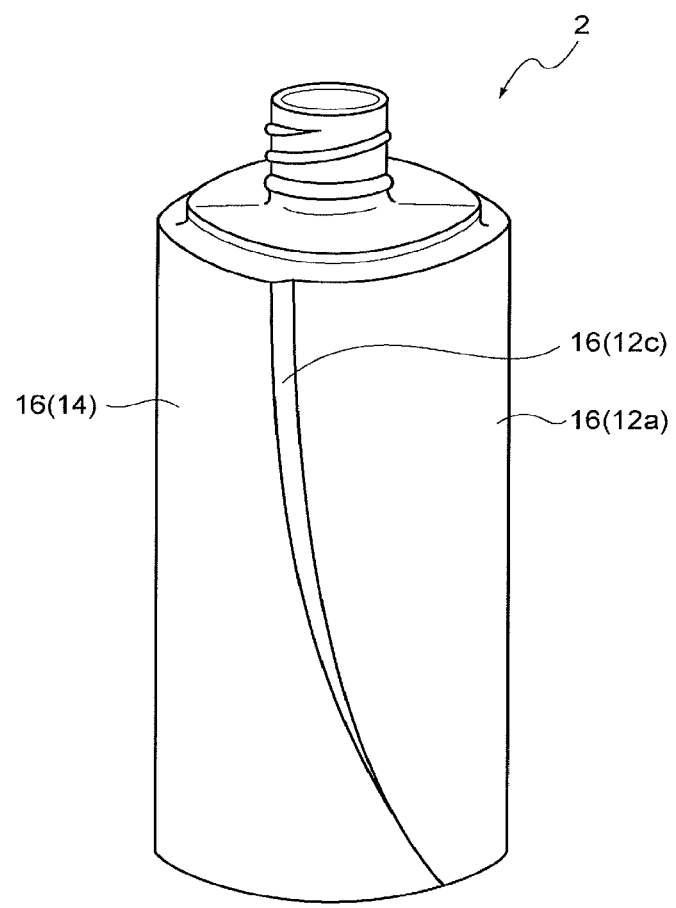
FIG. 6 is a view illustrating an example of the external appearance of the decorative glass container of the invention.

Subsequently, a bottle-necked glass container (height: 8 cm, cross-section length: 4 cm, cross-section width: 8 cm, bottle-necked part height: 1 cm, and bottle-necked part diameter: 2 cm) was prepared as illustrated in FIG. 6.

The composition for the first lower layer described above was air-sprayed starting from the periphery of the bottle-necked glass container for a predetermined time, and then baked under the conditions of 180° C. for 20 minutes, thereby forming the first lower layer with white pearl color, a thickness of 20 μm (abbreviated as 20 u in the Table 1), and pencil hardness of 3H in accordance with JIS K 5600.

(2) Step for Forming the Second Lower Layer

The step for forming the second lower layer is a step for forming the second lower layer entirely over the first lower layer by UV radiation treatment using a transparent UV curable resin. More specifically, a UV curable type application liquid for the second lower layer having a blend composition which contains, with respect to the total amount (100% by weight), 25% by weight of an urethane acrylate oligomer having a weight average molecular weight of 5,000, 4% by weight of an acrylate monomer mixture having a weight average molecular weight of less than 1,000, 5% by weight of an acrylic resin having a weight average molecular weight of 75,000, 1.5% by weight of a photopolymerization initiator, 1.5% by weight of a leveling agent, and remaining amount of an organic solvent was coated.

Subsequently, UV radiation was carried out to have a UV radiation amount of 400 mJ/cm$^2$ by using a UV radiation device. As a result, a clear second lower layer with a thickness of 5 μm (abbreviated as 5 u in the Table 1) was formed.

(3) Step for Forming Vapor-Deposition Layer

The step for forming a vapor-deposition layer is a step for forming an aluminum vapor-deposition layer entirely over the second lower layer by using a vacuum vapor-deposition apparatus (including a sputtering apparatus). More specifically, by using a vacuum vapor-deposition apparatus and an aluminum material, an aluminum vapor-deposition layer with silver color and a thickness of 30 angstrom was formed (abbreviated as 30 A in the Table 1).

(4) Step for Forming Decorative Layer

The step for forming the decorative layer is a step for forming a decorative layer containing a predetermined coloring agent or the like on the vapor-deposition layer by UV radiation treatment after coating a colored UV curable type application liquid.

More specifically, a UV curable type application liquid for a decorative layer having a blend composition which contains, with respect to the total amount (100% by weight), 8% by weight of an urethane acrylate oligomer having a weight average molecular weight of 5,000, 29% by weight of a polyfunctional acrylate monomer mixture having a weight average molecular weight of less than 1,000, 7% by weight of an acrylic resin having a weight average molecular weight of 75,000, 2% by weight of a photopolymerization initiator, 2% by weight of a coloring agent for obtaining beige color, and remaining amount of an organic solvent was coated. Subsequently, UV radiation was carried out to have a UV radiation amount of 400 mJ/cm$^2$ by using a UV radiation device. As a result, a beige-colored decorative layer with a thickness of 10 μm (abbreviated as 10 u in the Table 1) was formed (pencil hardness of 3H).

(5) Laser Processing

The glass container entirely provided with the vapor-deposition layer was subjected to a laser processing according to the following laser processing conditions. After that, by performing simultaneous etching a part of the vapor-deposition layer, the decorative layer, and the second lower layer, a patterned vapor-deposition layer or the like was formed as illustrated in FIG. 6.
Laser apparatus: LSS-U250VAH-W (trade name, manufactured by HORIUCHI ELECTRONICS CO., LTD.)
Type of laser: C02 laser
Laser wavelength: 1.06 μm
Laser output: 10%
Focal length: 117 mm
Output: 40 W
Processing time: 15 sec (6) Forming the First Overcoat Layer Subsequently, the UV curable resin for the first overcoat was sprayed and coated onto a glass container formed with the vapor-deposition layer or the like by using a spraying device, and at the same time, UV radiation was carried out by radiation of a predetermined amount of UV rays to form the first overcoat layer with a predetermined thickness.

More specifically, a UV curable type application liquid for the first overcoat layer having a blend composition which contains, with respect to the total amount (100% by weight), 10% by weight of a polyfunctional acrylate monomer mixture having a weight average molecular weight of less than 1,000, 17% by weight of an acrylic resin having a weight average molecular weight of 75,000, 1.5% by weight of a photopolymerization initiator, 1.5% by weight of a leveling agent, and remaining amount of an organic solvent was coated. Subsequently, UV radiation was carried out to have a UV radiation amount of 400 mJ I cm2 by using a UV radiation device. As a result, a first overcoat layer with a thickness of 10 μm (abbreviated as 10 u in the Table 1) was formed (pencil hardness of H).

(7) Forming the Second Overcoat Layer

Subsequently, the UV curable resin for the second overcoat was sprayed and coated onto a glass container formed with the first overcoat layer or the like by using a spraying device, and at the same time, UV radiation was carried out by radiation of a predetermined amount of UV rays to form the second overcoat layer with a predetermined thickness.

More specifically, a UV curable type application liquid for the second overcoat layer having a blend composition which contains, with respect to the total amount (100% by weight), 8% by weight of an urethane acrylate oligomer having a weight average molecular weight of 5,000, 29% by weight of a polyfunctional acrylate monomer mixture having a weight average molecular weight of less than 1,000, 7% by weight of an acrylic resin having a weight average molecular weight of 75,000, 2% by weight of a photopolymerization initiator, and remaining amount of an organic solvent was coated.

Subsequently, UV radiation was carried out to have a UV radiation amount of 400 mJ/cm$^2$ by using a UV radiation device. As a result, a second lower layer with a thickness of 10 μm (abbreviated as 10 u in the Table 1) was formed (pencil hardness of 3H) to give the decorative glass container 2 as illustrated in FIG. 6.

2. Evaluation of Decorative Glass Container

The obtained decorative glass container was evaluated as follows in terms of the pattern accuracy of the vapor-deposition layer and adhesion properties. Each of the obtained results is given in the Table 1.

(1) Evaluation of Pattern Accuracy of Vapor-Deposition Layer (Evaluation 1)

Clearness of the boundary line of the vapor-deposition layer in the obtained glass container was observed under an optical microscope, and the pattern accuracy of the vapor-deposition layer was evaluated according to the following evaluation criteria.
Very Good: Boundary line of the patterned vapor-deposition layer is even and very clear.
Good: Boundary line of the patterned vapor-deposition layer is almost even and clear.
Fair: Boundary line of the patterned vapor-deposition layer is slightly curved and little unclear.
Bad: Boundary line of the patterned vapor-deposition layer is largely curved and unclear.

(2) Adhesion Properties (Evaluation 2)

A cross cut tape method in accordance with JIS K 5600 was carried out with respect to the resulting glass container. From the number of peeled decorative layer including the vapor-deposition layer or the overcoat layer per 100 cross cuts, the adhesion properties were evaluated with reference to the following criteria.
Very Good: The number of peelings is 0/100 cross cuts or less. Good: The number of peelings is 3 or less/100 cross cuts. Fair: The number of peelings is 10 or less/100 cross cuts. Bad: The number of peelings is 10 or more/100 cross cuts.

Example 2

In the Example 2, the decorative glass container was manufactured in the same manner as the Example 1 except that the first lower layer of the Example 1 was not formed. Thereafter, evaluations of clearness of the boundary line of the vapor-deposition layer and adhesion properties were made.

Example 3

In the Example 3, the decorative glass container was manufactured in the same manner as the Example 1 except that the decorative layer of the Example 1 was not formed. Thereafter, evaluations of clearness of the boundary line of the vapor-deposition layer and adhesion properties were made.

Example 4

In the Example 4, the decorative glass container was manufactured in the same manner as the Example 1 except that the first overcoat layer of the Example 1 was not formed. Thereafter, evaluations of clearness of the boundary line of the vapor-deposition layer and adhesion properties were made.

Example 5

In the Example 5, the decorative glass container was manufactured in the same manner as the Example 2 except that, on the surface of the thin wall portion of the second lower layer in the Example 2, surface asperities (abbreviated as asperities in the Table 1) with Rz=1.5 μm were created. Thereafter, evaluations of clearness of the boundary line of the vapor-deposition layer and adhesion properties were made.

Comparative Example 1

In the Comparative example 1, the decorative glass container was manufactured in the same manner as the Example 1 except that, on the glass surface of the Example 1, a masking tape with a thickness of 40 μm is applied for overall formation of the first lower layer, second lower layer, vapor-deposition layer, and decorative layer and the first overcoat layer and the second overcoat layer are formed after peeling the masking tape. Thereafter, evaluations of clearness of the boundary line of the vapor-deposition layer and adhesion properties were made.

In addition, there is a phenomenon occurring during formation of the vapor-deposition layer that a step difference is generated in the edge part of the first lower layer or the second lower layer, and even the vapor-deposition layer, or the formed vapor-deposition layer is unevenly blackened due to scattering of air or low molecular weight components included in adhesives of the masking tape.

[Table 1]

TABLE 1

|  | Example 1 | Example 2 | Example 3 | Example 4 | Example 5 | Comparative example 1 |
|---|---|---|---|---|---|---|
| Overcoat layer | First: 10 u Second: 10 u | First: 10 u Second: 10 u | First: 10 u Second: 10 u | First: None Second: 10 u | First: 10 u Second: 10 u | First: 10 u Second: 10 u |
| Decorative layer | 10 um | 10 um | None | 10 um | 10 um | 10 um |
| Vapor-deposition layer | 30A | 30A | 30A | 30A | 30A | 30A |
| Lower layer | First: 20 u Second: 5 u | First: None Second: 5 u | First: 20 u Second: 5 u | First: 20 u Second: 5 u | First: None Second: 5 u asperities | First: 20 u Second: 5 u |
| Processing treatment | Laser | Laser | Laser | Laser | Laser | Tape |
| Evaluation 1 (pattern accuracy) | ◎ | ○ | ◎ | ◎ | ○ | X |
| Evaluation 2 (adhesion properties) | ◎ | ○ | ○ | ◎ | ◎ | X |

INDUSTRIAL APPLICABILITY

According to the decorative glass container and the method for manufacturing the decorative glass container according to the invention, a step difference is formed in a lower layer and also a patterned vapor-deposition layer is formed in response to the corresponding step difference by laser processing or the like, and as a result, the adhesion properties of the patterned vapor-deposition layer are improved and a more clear boundary line of the patterned vapor-deposition layer can be obtained.

Specifically, without using a hot stamping method or a masking jig (masking tape or the like), the adhesion properties of the patterned vapor-deposition layer or the like to a glass container are improved and a clearer boundary line of the patterned vapor-deposition layer can be obtained.

The invention claimed is:
1. A method for manufacturing a decorative glass container, the container comprising a lower layer including a first wall portion and a second wall portion, the first wall portion of the lower layer being thicker than the second wall portion of the lower layer, a patterned vapor-deposition layer, and an overcoat layer made of a UV curable resin, on an exterior surface of a glass substrate in order, the method comprising:

(1) a step of forming a precursor of the lower layer on the exterior surface of the glass substrate;

(2) a step of forming a vapor-deposition layer on the precursor of the lower layer;

(3) a step of removing simultaneously a part of the vapor-deposition layer and a part of the precursor of the lower layer, forming the patterned vapor-deposition layer, and exposing a part of the lower layer to give the second wall portion of the lower layer; and (4) a step of forming the overcoat layer on the patterned vapor-deposition layer and the second wall portion of the lower layer by coating of a UV curable resin, exposing the UV curable resin to UV radiation thus forming a contact region in which the second wall portion of the lower layer and the overcoat layer are in direct contact with each other.

2. The method for manufacturing a decorative glass container according to claim 1, further comprising a step (2') for forming a decorative layer on the vapor-deposition layer between the step (2) and step (3), wherein during the step (3), a part of each of the vapor-deposition layer, the precursor of the lower layer, and the decorative layer is simultaneously removed and a part of the lower layer is exposed to form the second wall portion of the lower layer.

3. The method for manufacturing a decorative glass container according to claim 1, wherein the simultaneous removal of the step (3) is carried out by laser processing.

4. The method for manufacturing a decorative glass container according to claim 1, wherein the overcoat layer is prepared by forming a first overcoat layer on the patterned vapor-deposition layer and the second wall portion of the lower layer and forming a second overcoat layer on the first overcoat layer, and a hardness of the second overcoat layer is greater than that of the first overcoat layer.

5. The method for manufacturing a decorative glass container according to claim 1, wherein the precursor of the lower layer is prepared by forming a first part of the precursor of the lower layer on the exterior surface of the glass substrate and forming a second part of the precursor of the lower layer on the first part of the precursor of the lower layer, the first part of the precursor of the lower layer contains a thermosetting resin, and the second part of the precursor of the lower layer contains a UV curable resin.

6. The method for manufacturing a decorative glass container according to claim 1, wherein a wall of the glass substrate comprises a step difference part formed of a first wall portion and a second wall portion, the first wall portion of the wall of the glass substrate being thicker than the second wall portion of the wall of the glass substrate, and each of the first wall portion and the second wall portion of the lower layer is formed in response to the first wall portion and the second wall portion of the wall of the glass substrate.

* * * * *